(12) United States Patent
Winoto (10) Patent No.: US 12,159,566 B1
(45) Date of Patent: Dec. 3, 2024

(54) BACKPLANE FOR MULTI-PANEL ULTRA-DENSE MICRO-LED DISPLAY

(71) Applicant: Tectus Corporation, Saratoga, CA (US)

(72) Inventor: Renaldi Winoto, Los Gatos, CA (US)

(73) Assignee: TECTUS CORPORATION, Cupertino, CA (US)

( * ) Notice: Subject to any disclaimer, the term of this patent is extended or adjusted under 35 U.S.C. 154(b) by 0 days.

(21) Appl. No.: 18/430,214

(22) Filed: Feb. 1, 2024

Related U.S. Application Data (60) Provisional application No. 63/592,243, filed on Oct. 23, 2023.

(51) Int. Cl.
  G09G 3/20    (2006.01)
  G06F 3/14    (2006.01)
  G09G 3/32    (2016.01)

(52) U.S. Cl.
  CPC ............ *G09G 3/2096* (2013.01); *G06F 3/14* (2013.01); *G09G 3/32* (2013.01); *G09G 2300/0804* (2013.01); *G09G 2370/10* (2013.01)

(58) Field of Classification Search
  CPC ...... G09G 3/2096; G09G 3/32; G09G 3/2003; G09G 2300/026; G09G 2360/04; G09G 5/02; G09G 5/006; G06F 3/14
  See application file for complete search history.

(56) References Cited

U.S. PATENT DOCUMENTS

| | | | |
|---|---|---|---|
| 9,818,804 B2 | 11/2017 | Hack | |
| 10,607,973 B2 | 3/2020 | Chang | |
| 10,650,737 B2 | 5/2020 | Vahid Far | |
| 10,989,376 B2 | 4/2021 | Oyer | |
| 11,037,980 B2 | 6/2021 | Iguchi | |
| 11,099,390 B2 | 8/2021 | Kim | |
| 11,114,022 B2 | 9/2021 | Prathaban | |
| 11,157,228 B2 * | 10/2021 | Kim | G09G 3/2096 |
| 11,177,425 B2 | 11/2021 | Li | |
| 11,244,937 B2 | 2/2022 | Su | |
| 11,508,700 B2 | 11/2022 | Pendse | |
| 11,521,543 B2 | 12/2022 | Morris | |
| 11,562,991 B2 | 1/2023 | Wang | |
| 11,579,171 B1 | 2/2023 | Percival | |
| 11,688,333 B1 | 6/2023 | Boecker | |
| 11,798,958 B2 | 10/2023 | Luo | |
| 11,810,484 B2 | 11/2023 | Chao | |

(Continued)

*Primary Examiner* — Xuemei Zheng
(74) *Attorney, Agent, or Firm* — AMSEL IP LAW PLLC; Jason Amsel (57) ABSTRACT

A display device suitable for augmented reality glasses or other display applications includes a three panels of ultra-dense micro-LED arrays integrated in a compact form factor. The panels each monochromatically generate red, green, and blue components of an image, and an optical element optically combines the image components to form an output image. Each panel includes a backplane with timing logic and CMOS pixel drivers for driving the micro-LED arrays. The backplanes may be interconnected in a master-slave configuration in which a master backplane receives image data from a host processor and sends image data directly or indirectly to the slave backplanes. The master backplane may furthermore output various timing signals to the slave backplanes to synchronize output of the image components.

20 Claims, 7 Drawing Sheets

(56) References Cited

U.S. PATENT DOCUMENTS

| | | |
|---|---|---|
| 11,961,431 B2 | 4/2024 | Wetzstein |
| 12,021,070 B2 | 6/2024 | Jia |
| 12,033,887 B2 | 7/2024 | Zhang |
| 2018/0307129 A1* | 10/2018 | Shin .................... G03B 21/204 |
| 2019/0043446 A1* | 2/2019 | Suzuki ................. G06F 3/1431 |

* cited by examiner

FIG. 1A

Output image 110

BACKPLANE FOR MULTI-PANEL ULTRA-DENSE MICRO-LED DISPLAY

CROSS-REFERENCE TO RELATED APPLICATIONS

This application claims the benefit of U.S. Provisional Patent Application No. 63/592,243 filed on Oct. 23, 2023, which is incorporated by reference herein.

BACKGROUND

Augmented reality (AR) glasses produce digital images which appear in one's field of view. AR glasses promise to provide an experience like having a private, wrap-around movie theater or digital workspace superimposed on the real world. Successful AR glasses depend on small, high-performance displays, such as proposed microscale light emitting diode (micro-LED) displays which may offer 2 K by 2 K or higher picture resolution in a millimeter-sized package that consumes only a few milliwatts.

DETAILED DESCRIPTION

A micro-LED display device operates with very small pixel pitch (e.g., <10 um) to generate high resolution images in a small form factor that is suitable for augmented reality glasses or similar display applications. The display device includes three panels that respectively generate the red, green, and blue components of an image, and an optical element that combines the image components. The three panels each have a pixel array and a backplane that includes timing logic, pixel drivers, and other supporting circuitry. The pixel drivers include digital-to-analog converters (DACs) implemented using complementary metal oxide semiconductor (CMOS) technology that enables the drivers to fit within tight pixel pitch of the device. Each backplane may be implemented as a single CMOS chip that includes the CMOS pixel drivers and various logic.

The backplanes for the three panels may be interconnected in a master-slave configuration that enables compatibility with a host processor system-on-chip (SoC) designed for single panel devices (such as a Mobile Industry Processor Interface (MIPI)-compliant host processor SoC). Here, one of the backplanes acts as a master backplane (which may be the backplane for any of the red, green, or blue panels), and the other two backplanes act as slave backplanes. The host processor SoC communicates high-speed image data only to the master backplane (e.g., in MIPI format) and thus may operate as if it is controlling a single panel device. The master backplane directly or indirectly sends the high-speed image data to the slave backplanes. For example, in one configuration, the master backplane directly outputs the high-speed image data to the slave backplanes via separate dedicated output ports. Alternatively, a serial configuration may be employed in which the master backplane directly sends the high-speed image data to only one of the slave backplanes, and that slave backplane then sends the high-speed image data to the other slave backplane. The respective backplanes each convert one of the color channels in the high-speed image data into respective drive signals for driving the pixel arrays of the corresponding panels. The backplanes may furthermore include interconnections for communicating synchronization and timing signals to enable the backplanes to output their respective image components in a synchronized manner.

In an example embodiment, the backplanes for the different panels may have the same architecture and may be manufactured according to the same manufacturing process. In this case, the backplanes may be configured post-manufacturing to operate as either a master or slave.

Figure 1A:
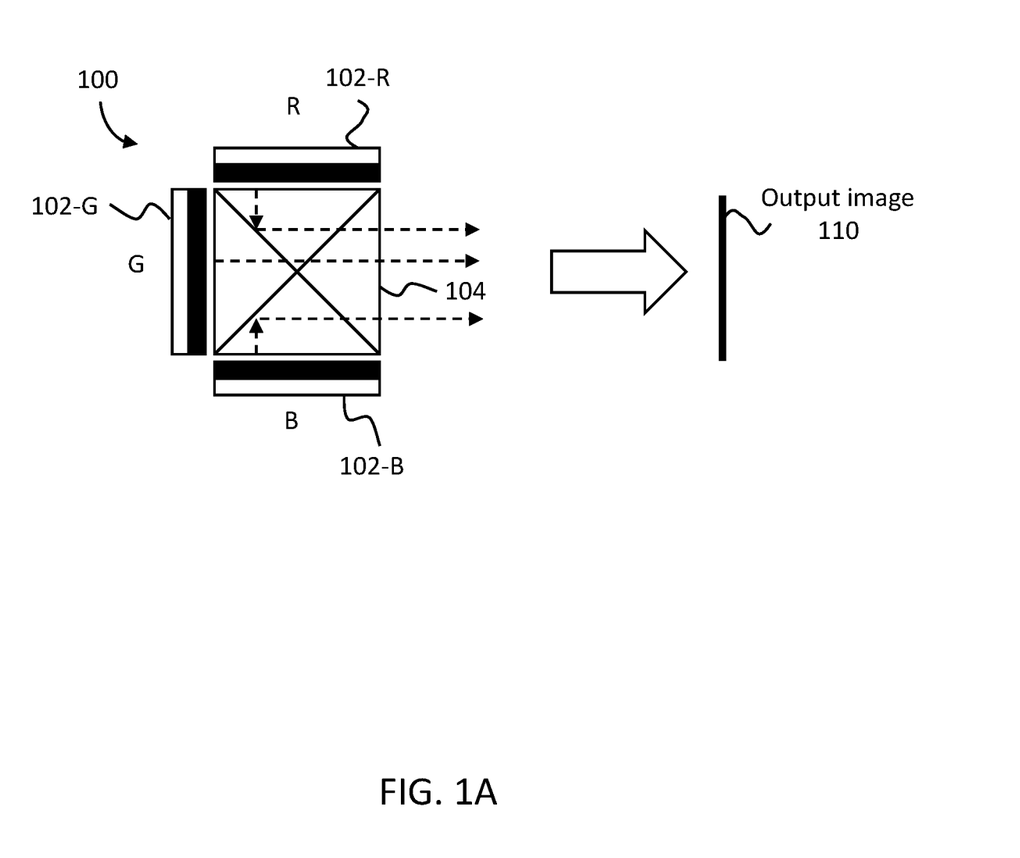
FIG. 1A is a first example embodiment of a schematic block diagram of a display device including a three-panel, ultra-dense micro-LED display.

FIG. 1A is a cross-sectional view of a first example embodiment of a display device 100. The display device 100 includes three panels 102-R, 102-G, 102-B (collectively referenced as panels 102) for producing red, green, and blue image components respectively of an output image 110. The output image 110 (and its respective components) may represent an individual frame of a video. For video display, the display device 100 may receive image data representing a sequence of individual video frames each having red, green, and blue color channels. For each frame, the panels 102 generate respective red, green, and blue image components that are output in a substantially synchronized manner. Frames of the video may be sequentially generated at a specified video frame rate (e.g., 30 frames per second, 60 frames per second, or any other frame rate).

The optical element 104 optically combines the respective images from the panels 102 such that all three image components become aligned in the image plane of the output image 110. The optical element 104 may include, for example, wavelength dependent mirrors, lenses, and/or other optical elements.

In FIG. 1A, the panels 102 may be arranged such that they form three faces of a cube or rectangular prism. FIG. 1A represents just one possible arrangement of the red, green, and blue panels 102. In alternative embodiments, the relative positions of the red panel 102-R, blue panel 102-B, and green panel 102-G may be switched according to any combination.

Figure 1B:
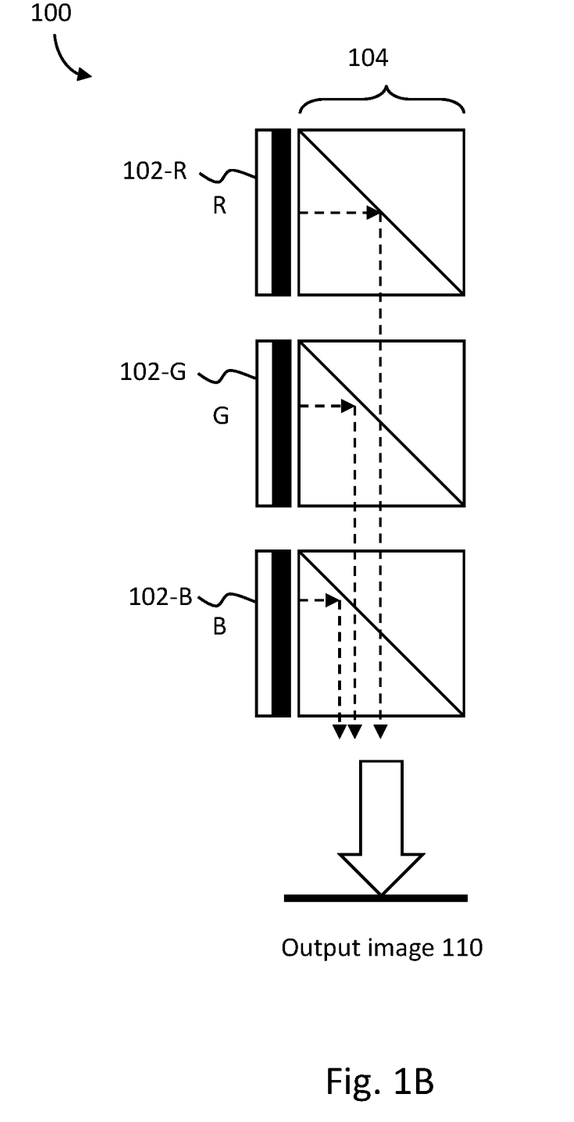
FIG. 1B is a second example embodiment of a schematic block diagram of a display device including a three-panel, ultra-dense micro-LED display.

FIG. 1B illustrates another example of a three-panel display device 100. In this example, the panels 102 are arranged in a side-by-side configuration and are aligned along an axis perpendicular to the image plane of the output image 110. The optical elements 104 combine the respective red, green, and blue images as described above.

In further alternative embodiments, the display device 100 may include other arrangements of the panels 102 and corresponding optical elements 104 to achieve the same effect of aligning the red, green, and blue image components.

Figure 2:
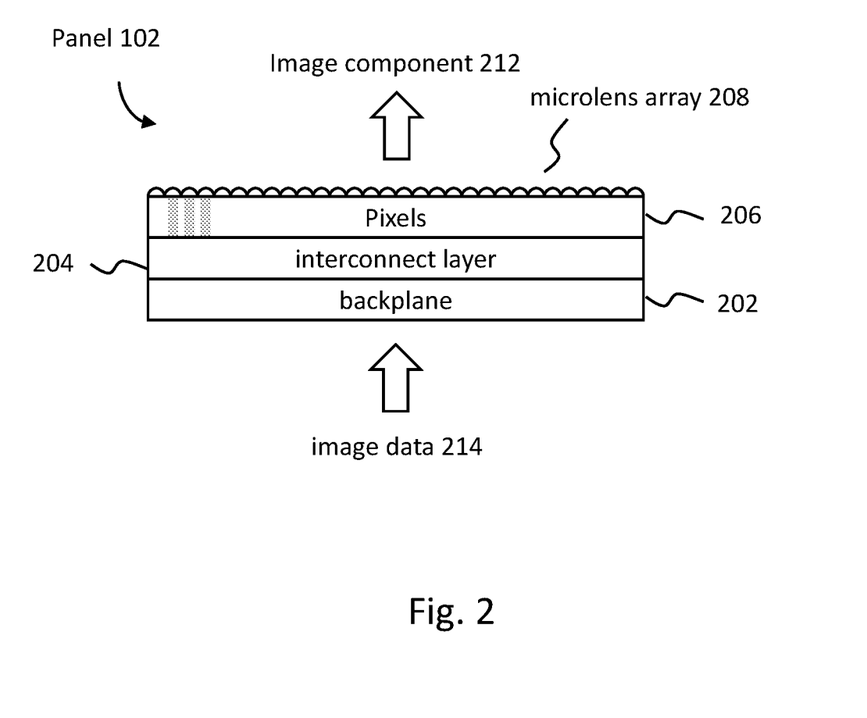
FIG. 2 is a cross-sectional view of an example embodiment of a panel for a micro-LED display device.

FIG. 2 illustrates a cross-sectional view of an individual panel 102. The panel 102 includes a backplane 202, an interconnect layer 204, a pixel layer 206, and a microlens array 208. The backplane 202 receives image data 214 from a host processor or other data source and generates driving signals for driving pixels of the pixel layer 206 (communicated through the interconnected layer 204) to produce the image component 212. The backplane 202 may be implemented using CMOS drivers and timing logic that enables a highly compact backplane layout. For example, the backplane may occupy an area having the same or smaller dimensions than the pixel array of the pixel layer 206. As will be discussed in further detail below, the backplane 202 may include, for example, digital-to-analog converters, timing controllers, drivers, and/or other elements for controlling the pixels in the pixel layer 206.

The backplane 202 couples to the pixel layer 206 via the interconnect layer 204, which may include connections between individual drivers and respective pixels. The pixel layer 206 may include an array of pixels for generating an image component 212 of the output image. The pixel layer 206 may be implemented using, for example, Gallium Nitride (GaN) light emitting diode (LED) technology. In an embodiment, the pixel layer 206 may include an ultra-dense array of micro-LED pixels. The pixels 206 are arranged in a grid characterized by a pitch, or spatial repetition distance. In an example embodiment, the pixel pitch may be less than 10 μm and may include, for example, an approximately 2 K×2 K array. The microlens array 208 includes an array of lenses that focus light from the pixel layer 206 to generate the image component 212. In an embodiment, the microlens array 208 may include one microlens for each pixel of the pixel layer 206.

Each of the different panels 102 for the different color components (as described in FIGS. 1A, 1B) may include similar or identical architectures for at least the backplane 202 and interconnect layer 204. Panels 102 for different colors may include different pixel layers 206 that have differently tuned LEDs for generating one of red, green, or blue light. Alternatively, the red, green, and blue panels 102 may include pixel layers 206 that are each tuned to for a common base color (e.g., blue light), and two of the panels may include a color conversion layer to convert the base color to the other colors (e.g., red and green light respectively).

Figure 3:
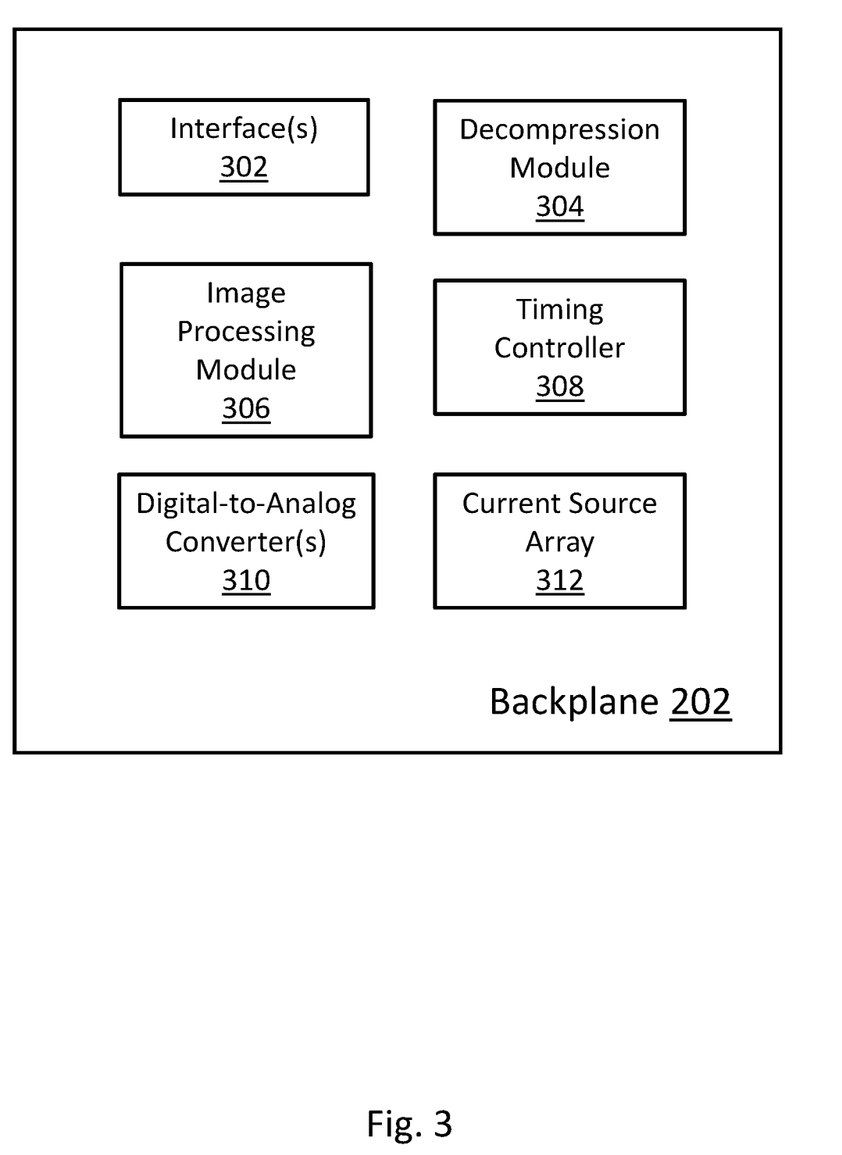
FIG. 3 is a block diagram for a backplane of panel in a micro-LED display device.

FIG. 3 illustrates an example architecture for a backplane 202. The backplane 202 includes a set of interfaces 302, a decompression module 304, an image processing module 306, a timing controller 308, a digital-to-analog convertor 310, and a current source array 312. Alternative embodiments may include different or additional components.

Figure 4A:
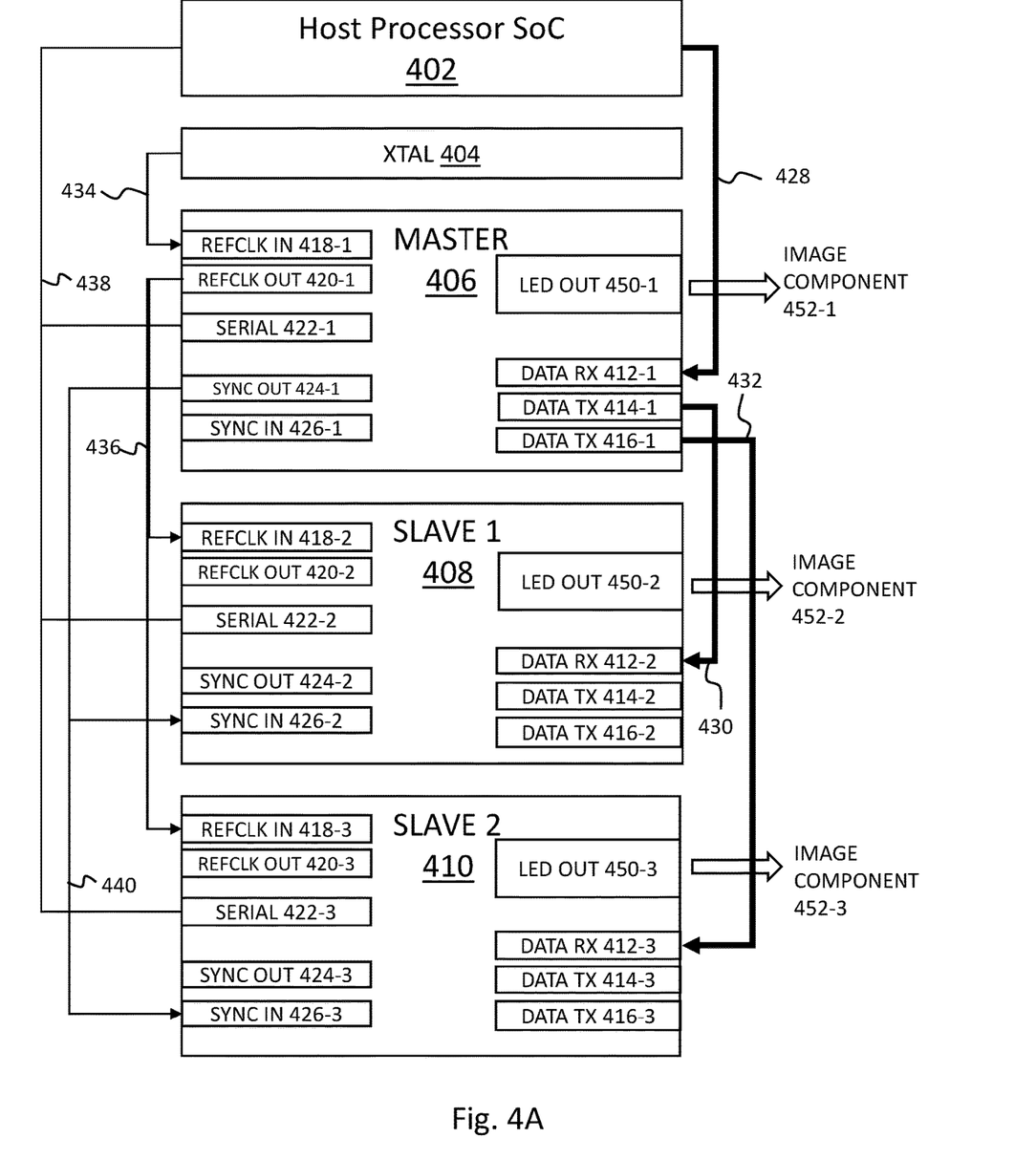
FIG. 4A is a first schematic illustrating an example connectivity configuration for a set of backplanes in a three-panel ultra-dense micro-LED display.
Figure 4B:
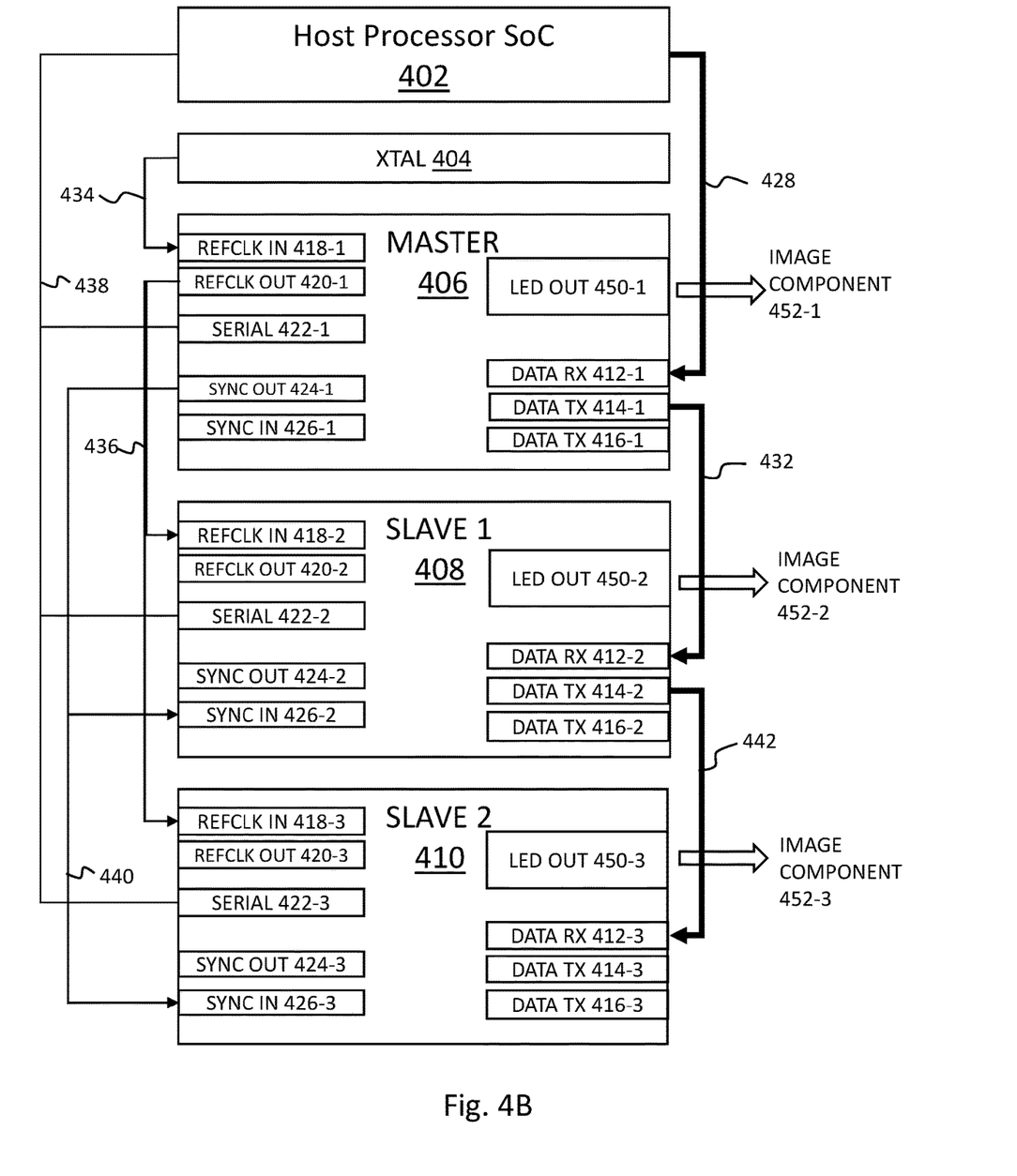
FIG. 4B is a second schematic illustrating an example connectivity configuration for a set of backplanes in a three-panel ultra-dense micro-LED display.

The interfaces 302 may include a set of ports for sending and/or receiving data signals, timing signals, synchronizations signals, control signals, pixel driving signals, or other signals associated with operation of the backplane 202. Examples of specific interfaces 302 and connectivity between them are illustrated in FIGS. 4A-4B and described in further detail below.

The decompression module 304 performs decompression of received image data. The decompression module 304 may operate according to various video decompression schemes that may be dependent on the specific type of compression applied in the received image data. For example, the decompression module 304 may operate according to MIPI compliant compression. In an alternative embodiment, the backplane 202 may receive image data in uncompressed form and the decompression module 304 may be omitted.

The image processing module 306 may perform various adjustments to received image data. For example, the image processing module 306 may perform color correction, non-uniformity correction, image enhancements, filtering, or other image processing effects. In alternative embodiments, image processing may be performed externally to the backplane 202 and the image processing module 306 may be omitted.

The timing controller 308 includes CMOS logic that controls timing of various operations of the backplane 202 including output timing of images. For example, the timing controller 308 may operate to synchronize output of an image frame to a particular frame rate. As will be described in further detail below, the timing controller 308 may furthermore generate and/or receive various timing signals to enable synchronization between different backplanes 202 of a display device 100.

The digital-to-analog converter 310 converts the image data (which may be decompressed and processed) from a digital signal to analog signals for controlling respective current sources of the current source array 312. For example, the digital values may represent brightness for each pixel and may be converted to respective analog current levels for driving the pixels to achieve the specified brightness. The current source array 312 drives the respective pixels in the pixel array 206 based on the current levels from the digital-to-analog converter 310. The digital-to-analog converters 310 may be implemented in CMOS to accommodate the very small pixel pitch (e.g., <10 um) of the pixel array 206. The CMOS converters 310 can be integrated with the timing controller 308 and other logic components (e.g., decompression module 304, image processing module 306) of the backplane 202 in a single chip.

The backplane 202 may optionally include various other supporting circuitry that supports functionality of the display device 100. For example, the backplane 202 may include various error correction/detection circuitry, power control circuits, sensors (e.g., temperature sensors) for detecting fault conditions, or other support elements associated with operation of the display device 100.

FIG. 4A illustrates an example schematic of a backplane system for a display device 100. This schematic illustrates the interface ports and interconnections between the respective backplanes of the multiple panels 102. In this example embodiment, one of the backplanes 202 operates as a master backplane 406 and the other two backplanes operate as slave backplanes 408, 410. The master backplane 406 is coupled to receive image data from a host processor SoC 402 and relay the image data to the slave backplanes 408, 410. The master backplane 406 may further generate various timing and/or synchronization signals utilized by the slave backplanes 408, 410 as will be described further below. The host processor SoC 402 outputs three color channels over a single data output interface coupled only to the master backplane 406. Thus, the panels 102 may be compatible with MIPI-compliant host processor SoCs traditionally used for single panel devices.

In an example implementation, the master backplane 406 and slave backplanes 408, 410 may be identically manufactured and may be configured post-manufacture to operate as either the master backplane 406 or a slave backplane 408, 410. Configurability may be controlled by, for example, a switch, a register value, an input control signal, or other configuration mechanism. Because all the backplanes 406, 408, 410 may have identical architectures, any of the red, blue, and green panels 102 could function as the master backplane 406 in various embodiments. In an alternative embodiment, the master backplane 406 and slave backplanes 408, 410 may have different design characteristics that are not configurable.

Each of the backplanes 406, 408, 410 includes a reference clock input port 418, a reference clock output port 420, a serial interface 422 such as a Serial Peripheral Interface (SPI), a synchronization input port 424, a synchronization output port 426, a data receive (RX) port 412, two data transmit (TX) ports 414, 416, and LED output ports 450. The data ports 412, 414, 416 may operate as a MIPI interface and may transmit or receive three color channels (red, green, and blue) of video data over a serial link. In alternative embodiments, the data ports 412, 414, 416 may comprise a different type of data interface such as a custom serializer-deserializer (SERDES) interface or other high-speed interface suitable for communicating image data.

The master backplane 406 may be connected to a host processor system-on-chip (SoC) 402. The host processor SoC 402 sends image data to the data RX port 412-1 of the master backplane 406 via a master data link 428. The master backplane 406 sends image data from one of the data TX ports 414-1 of the master backplane 406 to a data RX port 412-2 of a first slave device 408 over a first slave data link 430. The master backplane 406 may furthermore send image data from a second data TX port 416-1 of the master backplane 406 to a data RX port 412-3 of a second slave device 410 via a second slave data link 432. In an embodiment, the data RX port 412-1 and/or data TX port 416, 418 may include error detection/correction logic to detect and/or correct errors in received and/or transmitted data signals.

The master backplane 406 furthermore receives a timing signal at its reference clock input port 418-1 from a crystal oscillator (XTAL) 404 via a master clock link 434. Alternatively, the master backplane 406 may receive the timing signal from the host processor SoC 402 or a different timing signal source. The master backplane 406 outputs a timing signal from its reference clock output port 420-1 to the respective reference clock input ports 418-2, 418-3 of the slave backplanes 408, 410 via a slave clock link 436. In the illustrated example, the slave clock link 436 comprises a multi-drop link that is shared between the two slave backplanes 408, 410. In an alternative implementation, at least the master backplane 406 may include separate reference clock output ports 420-1 that separately connect to the respective reference clock input ports 418-2, 418-3 of the slave backplanes 408, 410 via separate dedicated slave clock links.

The master backplane 406 furthermore generates and outputs a synchronization signal on its synchronization output port 424-1 to a synchronization link 440. The slave backplanes 408, 410 each receive the synchronization signal from the synchronization link 440 via their respective synchronization input ports 426-2, 426-3. In the illustrated example, the synchronization link 440 comprises a multi-drop link that is shared between the two slave backplanes 408, 410. In an alternative implementation, at least the master backplane 406 may include separate synchronization output ports 424-1 that connect to the respective synchronization input ports 426-2, 426-3 of the respective slave backplanes 408, 410 via separate dedicated synchronization links.

The serial ports 422-1, 422-2, 422-3 of the respective backplanes 406, 408, 410 may each be coupled directly to the host processor SoC 402 via a shared serial link 438. Alternatively, separate serial links may couple between the host processor SoC 402 and the respective backplanes 406, 408, 410.

In an example operation, the host processor SoC 402 may output image data on the master data link 428 in data bursts that may include multiple frames of video. Each data burst may be received in advance of the output time for the respective video frames in the data burst. The master backplane 406 may receive and buffer the multiple frames of video received in the data burst. The master backplane 406 furthermore relays the data bursts to the slave backplanes 408, 410. The master backplane 406 and slave backplanes 408, 410 each identify the relevant color channel data in the received data and drive their corresponding pixel arrays with the appropriate frame timing (via the LED output ports 450) to produce the respective image components 452 in accordance with the specified frame rate. The respective backplanes 406, 408, 410 may utilize the reference clock and synchronization signals to synchronize the respective frame output times. Here, the master backplane 406 receives a master reference clock signal from the crystal oscillator 404 and generates a slave reference clock signal synchronized to the same frequency as the master reference clock signal (e.g., 40 megahertz). The master backplane 406 furthermore generates a synchronization signal on the synchronization link 440 that indicates when each backplane 406, 408, 410 should output the respective image components for the next frame (e.g., based on a number of clock cycles of the reference clock signal). In this manner the backplanes 406, 408, 410 output the respective image components in a substantially synchronized manner at the specified frame rate. Synchronization between the backplanes 406, 408, 410 need not be exact, and may be acceptable within a predefined error tolerance such that the panels output the respective color channels of the same frame during each frame period.

In another example implementation, the host processor SoC 402 controls frame output timing by sending the image data to the master backplane 406 one frame per frame period. Here, the image data for a frame may be received synchronously with a data clock signal on the master data link 428 that controls relative frame timing. The master backplane 406 similarly sends the image data to the slave backplanes 408, 410 together with the data clock signal. Upon receiving the image data, the backplanes 406, 408, 410 may immediately (within some latency tolerance) update the pixel drive signals to produce the respective image components. In this implementation, the reference clock links 436, reference clock ports 418, 420 synchronization link 440, and synchronization ports 424, 426 may be optionally omitted because the frame output timing is controlled by the host processor SoC 402.

The serial ports 422 may be utilized to communicate error data from the individual backplanes 406, 408, 410 to the host processor SoC 402. Examples of error data may include misconfiguration information (e.g., a message indicating that high-resolution data was received for a low-resolution display), a message indicating that an error check indicates corrupted data (e.g., failure of a cyclic redundancy check), or other types or error data. In an alternative embodiment, error data may instead be communicated over the 428, 430, 432. In this embodiment, the data interfaces 428, 430, 432 may include respective feedback channels that enable communication from the master backplane 406 to the host processor SoC 402 and/or from the slave backplanes 408, 410 to the master backplane 406.

FIG. 4B illustrates an alternative configuration of the backplane system for the display device 100. In this variation, the data link 434 from the first master backplane 406 to the second slave backplane 410 is omitted and a data link 442 is instead coupled between a data TX port 414-2 of the first slave device 408 and the data RX port 412-3 of the second slave device 410. Thus, instead of both slave devices 408, 410 receiving data in parallel from the master slave device 406, the slave devices 408, 410 are instead coupled in series. In this configuration, each backplane 406, 408, 410 can optionally include only a single TX data port 414 instead of two TX data ports 414, 416.

In an embodiment, the backplanes 406, 408, 410 may be configurable between the various connectivity configurations of FIGS. 4A and 4B described above. For example, the connectivity configuration may be set based on a switch, a register value, an external signal, or other configuration mechanism. In other embodiments, the backplanes 406, 408, 410 may be manufactured specifically for one of the above-described connectivity configurations.

Figure 5:
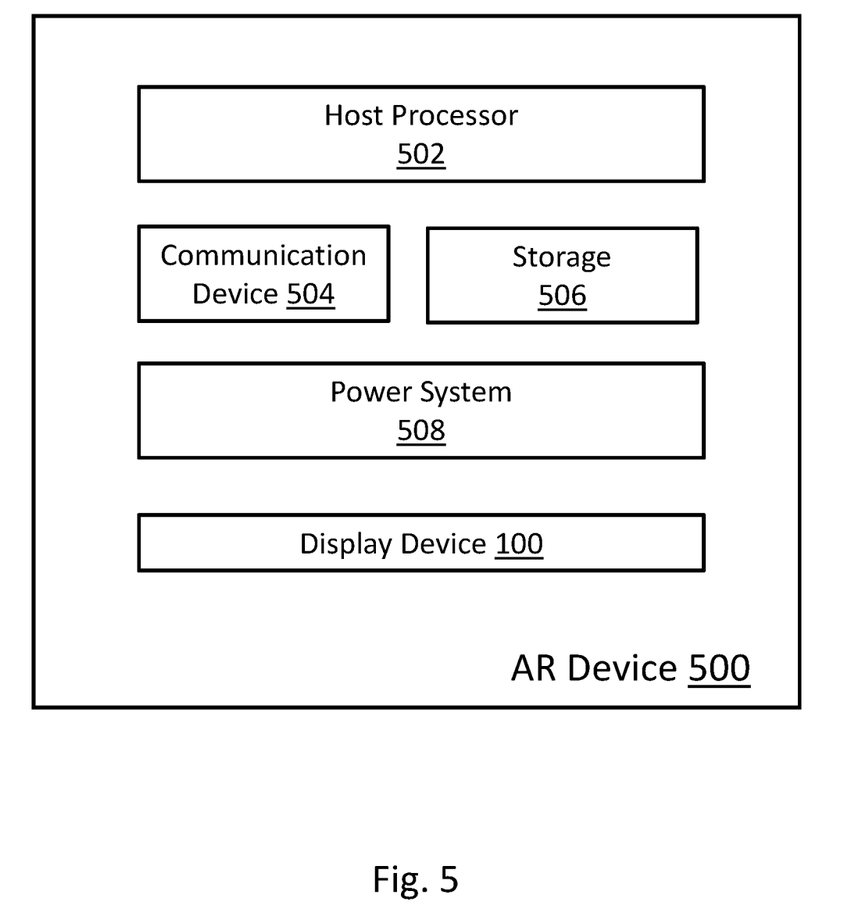
FIG. 5 is an example embodiment of an AR device that includes a three-panel ultra-dense micro-LED display.

FIG. 5 illustrates an example embodiment of an AR device 500 that incorporates the display device 100 (or more than one display device 100). The AR device 500 may include a host processor 502 that may execute various applications associated with AR content and/or virtual reality (VR) content. The applications produce image data, which may relate to user interfaces, media, gaming interfaces, etc. The AR device 500 may furthermore include storage 506 (e.g., volatile memory such as random-access memory (RAM) and/or non-volatile solid-state memory (e.g., FLASH memory) that may store the image data, configuration settings, applications, or other data. A communication device 504 may include various wired or wireless communication interfaces such as a WiFi interface, a cellular communication interface, a Bluetooth interface, a universal serial bus (USB) interface, or other communication interface. The communication device 504 may enable connection to a network, one or more controller devices, or other computing device. The power system 508 may comprise a power source (such as a battery and/or interface for a wired power source) and power management components to supply and manage power to the host processor 502, communication device 504, storage 506, and display device 100. The components of the AR device 500 may be integrated into a head-mounted form factor that allows the output image to be projected towards the eye of a user (or both eyes). Examples of form factors may include, for example, glasses, goggles, or another head-mounted device.

Upon reading this disclosure, those of ordinary skill in the art will appreciate still alternative structural and functional designs and processes for the described embodiments, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A display device, comprising:
a first display panel comprising a master backplane and a first micro-LED array, the master backplane to receive a master data signal from a host processor and drive the first micro-LED array based on the master data signal to generate a first image component in a first color, and the master backplane to output at least a first slave data signal;
a second display panel comprising a first slave backplane and a second micro-LED array, the first slave backplane to receive the first slave data signal and to drive the second micro-LED array based on the first slave data signal to generate a second image component in a second color;
a third display panel comprising a second slave backplane and a third micro-LED array, the second slave backplane to receive a second slave data signal and drive the third micro-LED array based on the second slave data signal to generate a third image component in a third color; and
an optical element to combine the first image component, the second image component, and the third image component.

2. The display device of claim 1, wherein the master backplane is further configured to generate the second slave data signal.

3. The display device of claim 1, wherein the first slave backplane is further configured to generate the second slave data signal.

4. The display device of claim 1, wherein the master backplane, the first slave backplane, and the second slave backplane have identical architecture, and wherein the master backplane, the first slave backplane, and the second slave backplane are each configurable to operate in master or slave modes.

5. The display device of claim 1, wherein the master backplane, the first slave backplane, and the second slave backplane each include pixel drivers for driving the first, second, and third micro-LED arrays respectively, wherein the pixel drivers are implemented using complementary metal oxide semiconductor (CMOS) technology.

6. The display device of claim 5, wherein the master backplane, the first slave backplane, and the second slave backplane further each include timing logic to control timing of generating the first image component, the second image component, and the third image component respectively, wherein the pixel drivers and the timing logic are integrated in a same chip.

7. The display device of claim 1, wherein the first micro-LED array, the second micro-LED array, and the third micro-LED array each have a pixel pitch of 10 µm or less.

8. The display device of claim 1, wherein the master data signal, the first slave data signal, and the second slave data signal are each MIPI-compliant signals.

9. The display device of claim 1, wherein the master backplane receives a master reference clock signal from a crystal oscillator and sends a slave reference clock signal synchronized to the master reference clock signal to the first slave backplane and the second slave backplane.

10. The display device of claim 1, wherein the master backplane generates a synchronization signal and sends the synchronization signal to the first and second slave backplanes, and wherein the master backplane, the first slave backplane, and the second slave backplane each control output timing of the first, second, and third image components respectively based on the synchronization signal.

11. The display device of claim 1, wherein the master backplane, the first slave backplane, and the second slave backplane are each coupled to the host processor via a feedback channel to communicate error information to the host processor.

12. A backplane system for a three-panel ultra-dense micro-LED display, the backplane system comprising:
a master CMOS backplane;
a first slave CMOS backplane connected to the master CMOS backplane; and
a second slave CMOS backplane connected to the master CMOS backplane;

wherein the master CMOS backplane, the first slave CMOS backplane, and the second slave CMOS backplane each have one data RX port, first and second data TX ports, a clock-in port, a clock-out port, and a serial port;

wherein the first data TX port of the master CMOS backplane is connected to the data RX port of the first slave CMOS backplane;

wherein a second data TX port of the master CMOS backplane is connected to the data RX port of the second slave CMOS backplane; and wherein the clock-out port of the master CMOS backplane is connected to the clock-in port of the first CMOS slave backplane and the clock-in port of the second slave CMOS backplane.

13. The backplane system of claim 12, wherein the data RX port and the first data TX port and the second data TX port comprise a mobile industry processor interface (MIPI) interface.

14. The backplane system of claim 12, wherein each of the master CMOS backplane, the first slave CMOS backplane, and the second slave CMOS backplane have identical architecture.

15. The backplane system of claim 12, wherein each of the master CMOS backplane, the first slave CMOS backplane, and second slave CMOS backplane have a synchronization input port and a synchronization output port, wherein the synchronization output port of the master CMOS backplane is coupled to the synchronization input ports of the first slave CMOS backplane and the second slave CMOS backplane.

16. The backplane system of claim 12, where each of the master CMOS backplane, the first slave CMOS backplane, and the second slave CMOS backplane have a serial port coupled to a host processor SoC.

17. The backplane system of claim 12, where the first data TX port of the master CMOS backplane is connected to the data RX port of the first slave CMOS backplane on a first dedicated data link, and wherein the second data TX port of the master CMOS backplane is connected to the data RX port of the second slave CMOS backplane on a second dedicated data link.

18. The backplane system of claim 12, wherein the master CMOS backplane the first slave CMOS backplane, and the second slave CMOS backplane are configured to drive respective micro-LED pixel arrays of different colors, where the respective micro-LED pixel arrays have a pixel pitch less than 10 um.

19. An augmented reality device including:

a host processor to generate a master data signal encoding video having three color channels;

a first display panel comprising a master backplane and a first micro-LED array, the master backplane to receive a master data signal from the host processor and drive the first micro-LED array based on the master data signal to generate a first image component in a first color, and the master backplane to output at least a first slave data signal;

a second display panel comprising a first slave backplane and a second micro-LED array, the first slave backplane to receive the first slave data signal and to drive the second micro-LED array based on the first slave data signal to generate a second image component in a second color;

a third display panel comprising a second slave backplane and a third micro-LED array, the second slave backplane to receive a second slave data signal and drive the third micro-LED array based on the second slave data signal to generate a third image component in a third color; and an optical element to combine the first image component, the second image component, and the third image component into an output image.

20. The augmented reality device of claim 19, wherein the augmented reality device comprises at least one of: a glasses device, a goggles device, and a head-mounted display device.

* * * * *